US008261263B2

(12) United States Patent
Fallon et al.

(10) Patent No.: US 8,261,263 B2
(45) Date of Patent: Sep. 4, 2012

(54) JVM SYSTEM SCOPE INITIALIZER

(75) Inventors: Dennis J. Fallon, Sharon, CT (US); James D. Johnston, Jr., Wappingers Falls, NY (US); Colette A. Manoni, Brewster, NY (US); Sarat Vemuri, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1679 days.

(21) Appl. No.: 11/565,186

(22) Filed: Nov. 30, 2006

(65) Prior Publication Data

US 2008/0134172 A1 Jun. 5, 2008

(51) Int. Cl.
 G06F 9/46 (2006.01)
 G06F 9/455 (2006.01)
 G06F 9/44 (2006.01)
(52) U.S. Cl. .............................. 718/1; 718/100; 717/170
(58) Field of Classification Search .................. None
 See application file for complete search history.

(56) References Cited

U.S. PATENT DOCUMENTS

| | | | |
|---|---|---|---|
| 6,343,308 B1 * | 1/2002 | Marchesseault | 718/1 |
| 6,704,804 B1 | 3/2004 | Wilson et al. | |
| 6,738,977 B1 * | 5/2004 | Berry et al. | 719/332 |
| 6,823,509 B2 * | 11/2004 | Webb | 718/1 |
| 6,829,761 B1 * | 12/2004 | Sexton et al. | 717/165 |
| 6,842,759 B2 | 1/2005 | Haggar et al. | |
| 6,851,112 B1 * | 2/2005 | Chapman | 718/1 |
| 6,925,638 B1 | 8/2005 | Koved et al. | |
| 7,051,210 B2 | 5/2006 | Scheetz et al. | |
| 7,124,291 B1 * | 10/2006 | Fresko | 713/1 |
| 7,131,122 B1 * | 10/2006 | Lakhdhir | 717/168 |
| 7,293,267 B1 * | 11/2007 | Fresko | 717/166 |
| 7,421,707 B2 * | 9/2008 | Fresko | 719/320 |
| 7,426,720 B1 * | 9/2008 | Fresko | 717/140 |
| 2002/0087958 A1 * | 7/2002 | Krause | 717/166 |
| 2002/0138739 A1 | 9/2002 | Scheetz et al. | |
| 2002/0174161 A1 | 11/2002 | Scheetz et al. | |
| 2004/0117369 A1 | 6/2004 | Mandal et al. | |
| 2005/0138623 A1 * | 6/2005 | Fresko | 718/102 |
| 2005/0268290 A1 * | 12/2005 | Cognigni et al. | 717/139 |
| 2006/0064545 A1 * | 3/2006 | Wintergerst | 711/130 |
| 2007/0078947 A1 * | 4/2007 | Lakhdhir | 709/217 |
| 2007/0106716 A1 * | 5/2007 | Corrie | 707/206 |
| 2007/0162498 A1 * | 7/2007 | Mishra | 707/104.1 |

OTHER PUBLICATIONS

Jens Krause et al. ("safe class sharing among java processes", Apr. 24, 2000, computer science/mathematics—Research report—xP-002231106, pp. 1-14.* Wong et al. ("Dynamically loaded classes as shared libraries: an approach to improving virtual machine scalability", IEEE, 2003, pp. 1-10.*

* cited by examiner

Primary Examiner — Jennifer To
Assistant Examiner — Caroline H Arcos
(74) Attorney, Agent, or Firm — Cantor Colburn LLP; Steven Chiu

(57) ABSTRACT

In an embodiment of the present invention the Java Virtual Machine (JVM) System Scope Initializer works on the premise of generating one JVM instance to be used by all processes system wide. An advantage in the present invention is that all processes that would normally otherwise have to instantiate a JVM, which can be on the order of millions of instructions (per process) can in large part be avoided realizing instead a tremendous system resource savings system wide. Another advantage can be that all processes that would normally otherwise have to instantiate a JVM, which can have a memory footprint on the order of megabytes (per process), can share the same memory view again realizing tremendous system resource savings system wide.

1 Claim, 3 Drawing Sheets

1000

JVM SYSTEM SCOPE INITIALIZER

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to a Java Virtual Machine (JVM) System Scope Initializer and in particular to a JVM System Scope Initializer that works on the premise of generating one JVM instance to be used by all processes system wide.

2. Description of Background

Before our invention in many Java Virtual Machine (JVM) implementations a high amount of memory and instruction cycles were consumed during a typical JVM instantiation. In this regard, many instances of the same JVM and classes were typically loaded and uniquely dedicated to a specific software process. As such, essentially multiple copies of the same JVM and classes were consuming a large amount of memory, processing cycles, and other system resources.

This added processing overhead and reduction in system resources was adversely affecting high transaction. As such, optimizing auxiliary Java applications as to not adversely interfere with core business transaction resources gives rise to the present invention.

SUMMARY OF THE INVENTION

The shortcomings of the prior art are overcome and additional advantages are provided through the provision of a method of optimizing utilization of system resources in a system using a java virtual machine (JVM) by implementing JVM System Scope Initializer, the method comprising adding a plurality of classes to a JVM System Scope Initializer; creating an allocator that males use of system viewable writable storage; running the JVM System Scope Initializer initializing each of the plurality of classes once for use by a plurality of software processes; updating the JVM System Scope Initializer as necessary; and loading additional classes as necessary.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution which effectuates a Java Virtual Machine (JVM) System Scope Initializer that works on the premise of generating one JVM instance to be used by all processes system wide realizing significant memory and other system resource savings.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Turning now to the drawings in greater detail, it will be seen that in an exemplary embodiment of the present invention, the Java Virtual Machine (JVM) System Scope Initializer works on the premise of generating one JVM instance to be used by all processes system wide.

In this regard, several advantages are realized. One such advantage is that all processes that would normally otherwise have to instantiate a JVM, which can be on the order of millions of instructions (per process) can in large part be avoided. In an exemplary embodiment, this can be a tremendous system resources savings system wide.

Another advantage can be that all processes that would normally otherwise have to instantiate a JVM, which can have a memory footprint on the order of megabytes (per process), can share the same memory view. In an exemplary embodiment this can be another tremendous system resources savings system wide.

Another advantage can be that the bulk of JVM initializations run only once. From the perspective of software design this can result in a more robust software design as the system is exposed to fewer unforeseen problems then can arise when several JVMs per second are instantiated.

Another advantage can be that in an exemplary embodiment of the present invention that 'freezing' the state of the JVM, can allow for easier debugging of the JVM itself.

Another advantage can be that in implementing the present invention there is flexibility in allowing the programmer to decide which classes will be initialized once by the JVM System Scope Initializer or left to be initialized as needed by the copy-on-write feature. In this regard, the present invention allows a programmer to better manage, optimize, and engineer code that consumes fewer system resources and operates more efficiently.

Figure 1:
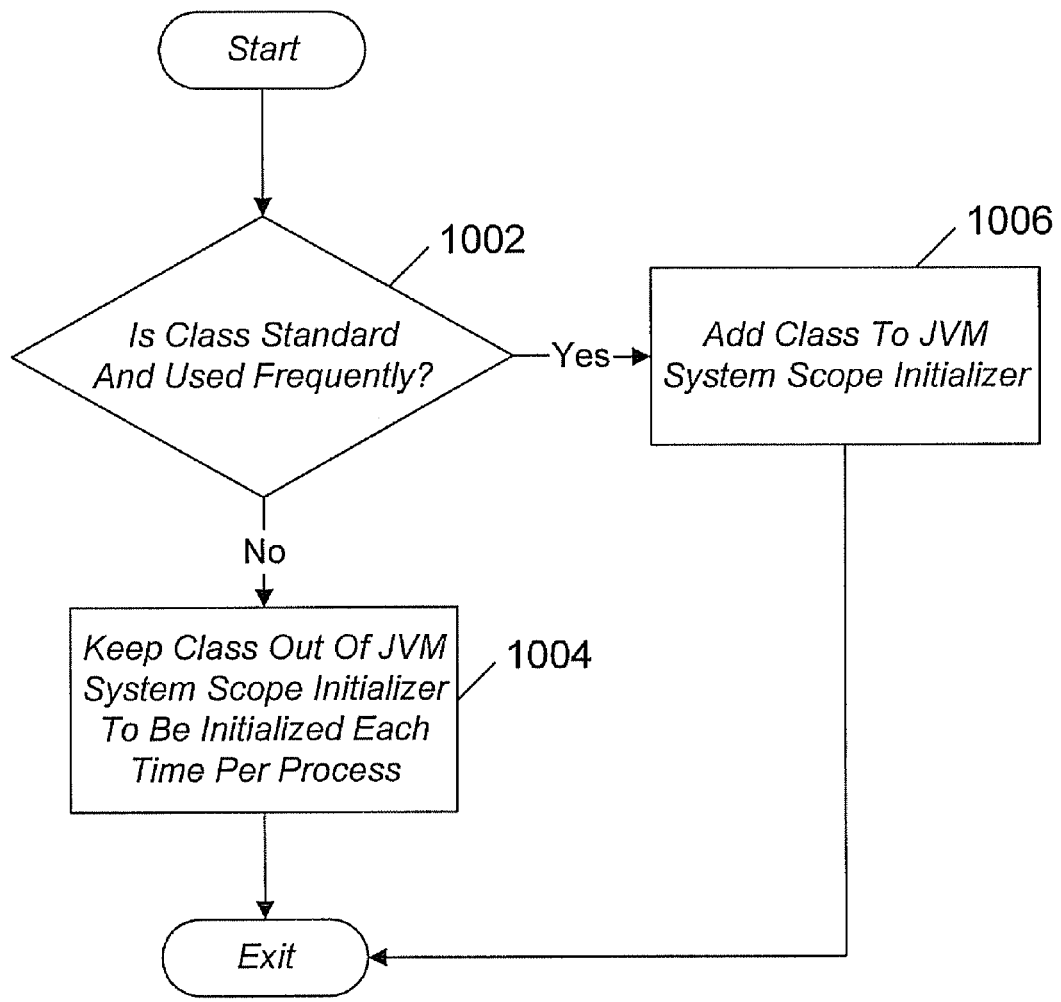
FIG. 1 illustrates one example of a method of determining which classes should be added to the JVM System Scope Initializer.

Referring to FIG. 1 there is illustrated one example of a method of determining which classes should be added to the JVM System Scope Initializer. In an exemplary embodiment for example and not limitation, a programmer can decide which classes should be added to the JVM System Scope Initializer and which classes should be left out to be initialized each time they are need by the application. The method begins in decision block 1002.

In decision block 1002 a determination is made as to whether or not a class is a standard class and used frequently. If the determination is in the affirmative that is a class is standard and used frequently then processing moves to block 1006. If the resultant is in the negative that is a class is not standard and or not used frequently then processing moves to block 1004.

In block 1004 the decision by the programmer can be to keep the class out of the JVM System Scope Initializer and as such the class will be initialized by the application each time it is needed. The method is then exited.

In block 1006 the programmer can decide to add the class to the JVM System Scope Initializer. As such, the class will be initialized once and shared as needed. The method is then exited.

Figure 2:
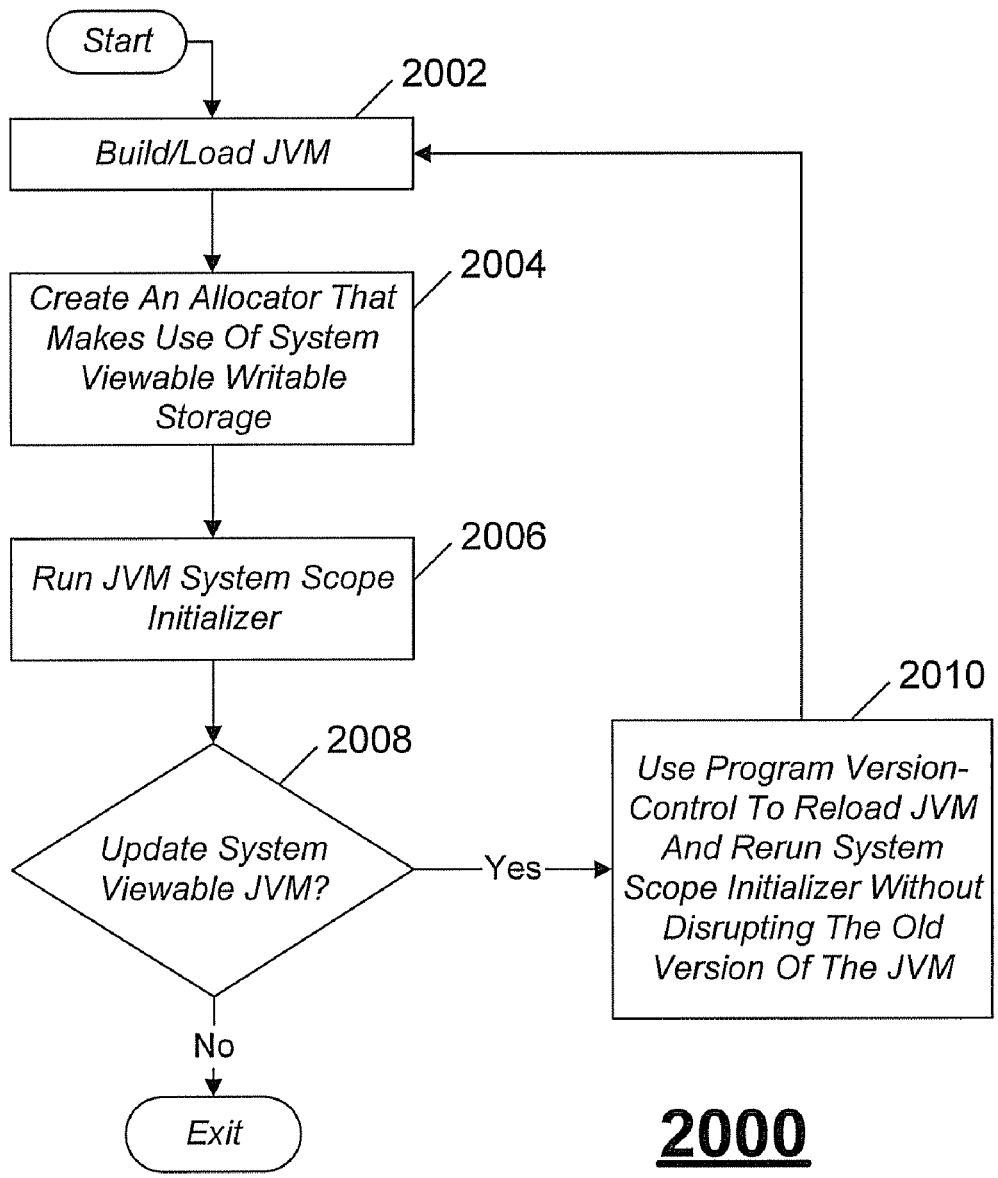
FIG. 2 illustrates one example of a method of updating a system viewable JVM and using copy-on-write to load a class.

Referring to FIG. 2 there is illustrated one example of a method of updating a system viewable JVM and using copy-on-write to load a class. In an exemplary embodiment, the JVM System Scope Initializer makes use of a feature that allows for a function to be executed only once the first time a program (shared object or executable) is used in the entire system. Furthermore, this 'first call system scope' initializer will copy the process static data that was changed during this initializer run, back into program. By copying this static information back the updates are now visible by all applications system wide that need to access the particular program that has run this initializer.

In an exemplary embodiment, it is important to note that the 'first call system scope' initializer has limitations and cannot by itself be used to create an instance of a JVM usable by all applications on the system. One limitation is that the values copied cannot be process specific. The most common example of this restriction is heap. Heap that was acquired during would be meaningless and potentially inaccessible by subsequent applications referencing it. It is not uncommon to find that JVM initializations are full of process scope memory pointers scattered in the static section of a program.

In an exemplary embodiment of the present invention, in order to overcome this limitation an allocator is created that makes use of system scope writable storage (intercepting the normal allocator calls). Expanding on this implementation, the same static data of the JVM program for use by the allocator can be used. This makes it very easy to use the same mechanism that the 'first call system scope' initializer would use to copy static storage updates made by the allocator back into the program. This effectively captures all the JVM initialization storage from 'malloc' allocations and makes them viewable across the system.

In taking this approach some important assumptions about what really matters in the production environment from both a technical and cost/benefit perspective are made. Obviously the reason the JVM has process only viewable memory allocations is because it is anticipated that each process will have specific information which the process only should access and view. This is a trade off of uniqueness vs. resource cost to create the unique environment. Using the JVM System Scope Initializer can take away from process uniqueness, meaning that all Java applications would be accessing the same loaded class. However, a tremendous savings occurs from not having to initialize the class in question each time (which includes construction of a class control structure within the JVM). To allow for process uniqueness the JVM System Scope Initializer can take advantage of two features. One such feature is program version-control and a second such feature is copy-on-write. Version-control allows loading the same program multiple times on a production system without disrupting current activities, and copy-on-write which allows process unique updates to shared static storage.

In an exemplary embodiment of the present invention, copy-on-write is a feature that allows for the JVM System Scope Initializer to work with subsequent processes. As such, it allows multiple applications unique write access to one copy of static data. Copy-on-write is not cheap from a system resource perspective, but it does provide a way for the JVM to load classes that haven't been loaded yet unique to only that process. For example, if the application environment requires that a class with the same name be unique to the process then we can remove it from JVM System Scope Initializer and allow for the process to load the class uniquely and attach it to the system viewable JVM by use of the copy-on-write.

In addition, to update the system viewable JVM it is important to note that in an exemplary embodiment the class must be reloaded and the JVM System Scope Initializer must be rerun. This is where program versioning comes into play allowing such an action to take place without disrupting the older version of the JVM.

During operation, it is expected that standard classes most likely do not need several versions dependent on the process. As example and not limitation, in the case of primitive classes, it may not make sense to keep reinitializing these each time. The method begins in block 2002.

In block 2002 the JVM is built and or loaded and processing moves to block 2004.

In block 2004 an allocator that makes use of system viewable writeable storage is created. Processing then moves to block 2006.

In block 2006 the JVM System Scope Initializer is run. Processing then moves to decision block 2008.

In decision block 2008 a determination is made as to whether or not the system viewable JVM needs to be updated. If the resultant is in the affirmative that is the JVM needs to be updated then processing moves to block 2014. If the resultant is in the negative that is the JVM does not need to be updated then system initialization is complete and the routine is exited.

In block 2010 version-control is used to reload the JVM and rerun the JVM System Scope Initializer without disrupting the old version of the JVM. Processing then returns to block 2002.

Figure 3:
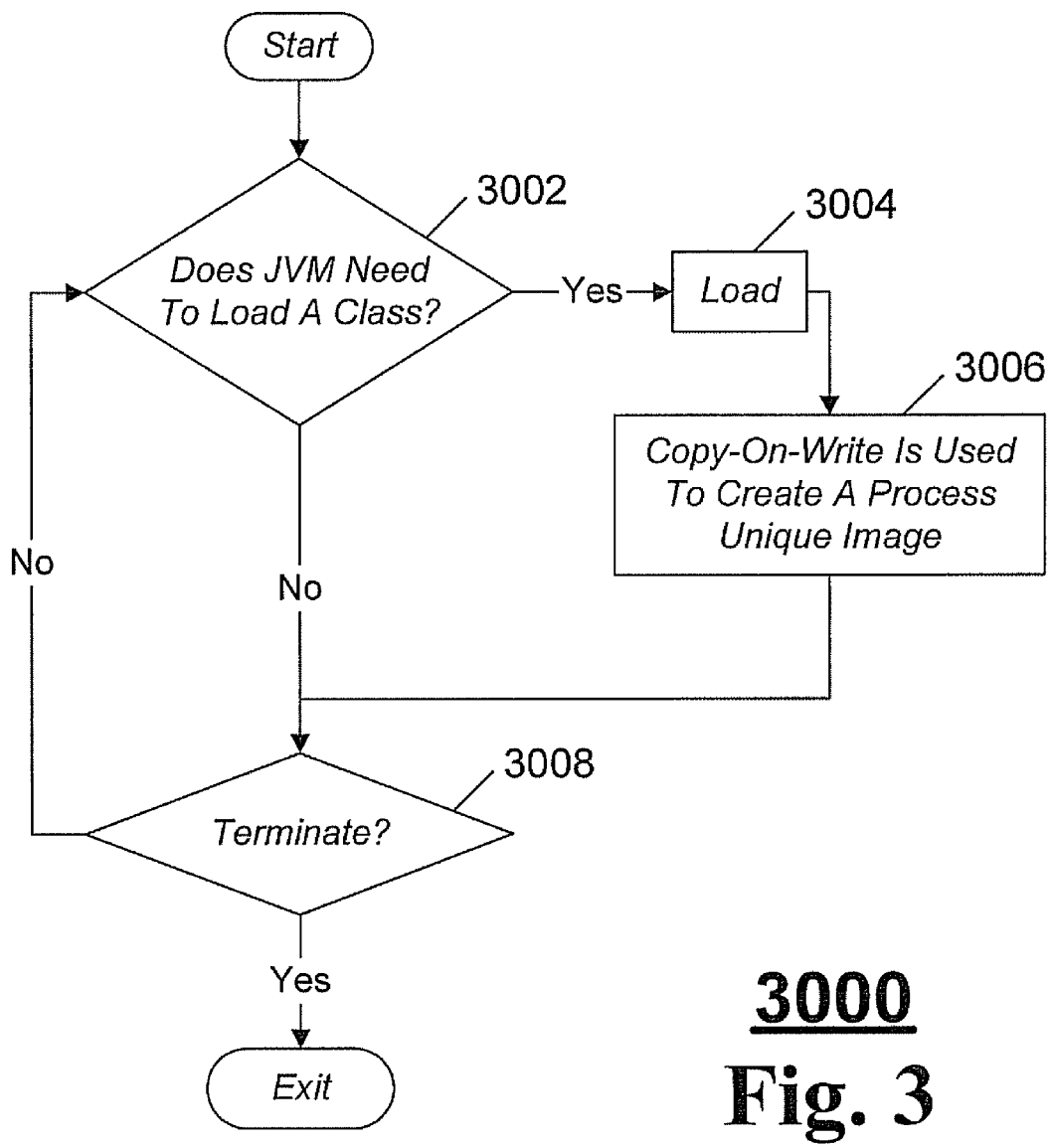
FIG. 3 illustrates one example of a method for handling subsequent Java processes after the system scope initializer has run.

Referring to FIG. 3 there is illustrated one example of a method for handling subsequent Java processes after the system scope initializer has run. The method begins in decision block 3002.

In decision block 3002 a determination is made as to whether or not the JVM needs to load a class. If the resultant is in the affirmative that is the JVM needs to load a class then processing moves to block 3004. If the resultant is in the negative that is the JVM does not need to load a class then processing moves to decision block 3008.

In block 3004 a class is loaded and processing moves to block 3006.

In block 3006 the copy-on-write feature is used to create a unique process image. Processing then moves to decision block 3008.

In decision block 3008 a determination is made as to whether or not the application is terminated. If the resultant is in the affirmative that is the application has been terminated then the routine is exited. If the resultant is in the negative that is the application has not been terminated then processing returns to decision block 3002.

As a result of the present invention, the application programmer and or customer now have several options available to fine-tune the production environment. If the class is standard and used frequently in the system then it can be added to the JVM System Scope Initializer to be initialized once across the system saving resources. If the class tends to be process unique or not frequently used then it can be kept out of the JVM System Scope Initializer to be initialized as necessary.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may male various improvements and enhancements which fall within the scope of the claims which follow. These claims should be construed to maintain the proper protection for the invention first described.

What is claimed is:

1. A method of optimizing utilization of system resources in a system using a Java virtual machine (JVM) by implementing a JVM system scope initializer, said method comprising:

adding a plurality of classes to the JVM system scope initializer;

creating an allocator that makes use of system viewable writable storage;

running said JVM system scope initializer initializing each of said plurality of classes once for use by a plurality of software processes, said plurality of software processes share a single instantiation of said JVM;

updating said JVM system scope initializer as necessary; and loading additional classes as necessary, wherein said loading additional classes as necessary includes loading classes by way of a copy-on-write, wherein the copy-on-write writes software process unique updates to a shared static storage allowing access to one copy of static data in a single memory view viewable by said JVM;

wherein said updating includes updating by using program-versioning to reload said JVM and rerun said JVM system scope initializer without disrupting any previous versions of said JVM.

* * * * *